US012368725B2

(12) United States Patent
Cambridge et al.

(10) Patent No.: US 12,368,725 B2
(45) Date of Patent: Jul. 22, 2025

(54) METHODS, SYSTEMS, AND MEDIA FOR PRESENTING ALERTS INDICATING MALICIOUS ACTIVITY

(71) Applicant: McAfee, LLC, Santa Clara, CA (US)

(72) Inventors: Rodney D. Cambridge, Ruislip (GB); Jonathan D. Dyton, Aylesbury (GB)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 16/050,122

(22) Filed: Jul. 31, 2018

(65) Prior Publication Data

US 2020/0045062 A1    Feb. 6, 2020

(51) Int. Cl.
*H04L 9/40*    (2022.01)
*G06F 21/55*   (2013.01)
*G08B 7/06*    (2006.01)
*H04W 12/121*  (2021.01)
*H04W 12/08*   (2021.01)

(52) U.S. Cl.
CPC ............ *H04L 63/1416* (2013.01); *G08B 7/06* (2013.01)

(58) Field of Classification Search
None
See application file for complete search history.

(56) References Cited

U.S. PATENT DOCUMENTS

| | | | |
|---|---|---|---|
| 7,043,758 B2 * | 5/2006 | Grupe | G06F 21/50 726/25 |
| 9,618,222 B1 * | 4/2017 | Hussain | G05B 19/048 |
| 9,674,664 B1 | 6/2017 | Laursen et al. | |
| 9,686,296 B1 | 6/2017 | Murchison et al. | |
| 9,866,585 B2 * | 1/2018 | Grupe | G06F 21/50 |
| 10,021,112 B2 * | 7/2018 | Balasubramaniam | H04L 63/145 |
| 10,332,387 B1 * | 6/2019 | Trundle | G08B 25/08 |
| 10,398,003 B2 * | 8/2019 | Eddins | H05B 47/18 |
| 10,505,986 B1 * | 12/2019 | Messick | H04L 63/1416 |
| 10,516,686 B2 * | 12/2019 | Jover | H04L 63/1425 |
| 10,546,470 B2 * | 1/2020 | Bruck | G08B 29/22 |

(Continued)

FOREIGN PATENT DOCUMENTS

KR    20160096247    8/2016

OTHER PUBLICATIONS

Smart-Phones Attacking Smart-Homes. Sivaraman et al. ACM. (Year: 2016).*

(Continued)

*Primary Examiner* — Venkat Perungavoor
(74) *Attorney, Agent, or Firm* — Byrne Poh LLP

(57) ABSTRACT

Methods, systems, and media for presenting alerts of malicious activity are provided. In some embodiments, a method for presenting alerts of malicious activity is provided, the method comprising: detecting malicious activity on a first user device connected to a router; identifying a group of user devices connected to the router; selecting a second user device of the group of user devices with which to present an alert of the malicious activity based on a likelihood that a user of the second user device is within a predetermined range of the second user device; determining a characteristic of the alert based on a capability of the second user device; and causing the alert of the malicious activity to be presented by the second user device in the determined characteristic of the alert.

24 Claims, 5 Drawing Sheets

(56) References Cited

U.S. PATENT DOCUMENTS

| | | | |
|---|---|---|---|
| 2012/0131672 A1* | 5/2012 | O'Reirdan | H04N 21/4753 726/23 |
| 2014/0062650 A1* | 3/2014 | Yamada | G07C 9/20 340/5.3 |
| 2014/0218517 A1* | 8/2014 | Kim | H04L 12/2825 348/143 |
| 2015/0047039 A1 | 2/2015 | O'Reirdan et al. | |
| 2015/0245081 A1 | 8/2015 | Cook | |
| 2018/0091526 A1* | 3/2018 | Cammarota | H04W 4/70 |
| 2018/0129805 A1* | 5/2018 | Samuel | G06F 21/86 |
| 2018/0139821 A1* | 5/2018 | Deshpande | H05B 47/115 |
| 2018/0152312 A1* | 5/2018 | Zheng | H05B 47/105 |
| 2018/0191771 A1* | 7/2018 | Newman | H04L 63/1433 |
| 2018/0302412 A1* | 10/2018 | Achtermann | H04L 41/0893 |
| 2018/0302424 A1* | 10/2018 | Bender | G06F 21/552 |
| 2018/0350170 A1* | 12/2018 | Wang | G06F 1/3231 |
| 2018/0375887 A1* | 12/2018 | Dezent | H04L 67/30 |
| 2019/0035242 A1* | 1/2019 | Vazirani | G08B 25/001 |
| 2019/0095620 A1* | 3/2019 | Guri | H04L 67/12 |
| 2019/0132340 A1* | 5/2019 | Ionescu | H04L 63/145 |
| 2019/0171510 A1* | 6/2019 | Smith | H04L 43/10 |
| 2019/0182271 A1* | 6/2019 | Cho | G06F 21/554 |
| 2019/0222590 A1* | 7/2019 | Mady | H04L 63/20 |
| 2019/0222594 A1* | 7/2019 | Davis, III | H04L 41/0816 |
| 2019/0287383 A1* | 9/2019 | Quick | G08B 25/10 |
| 2019/0334933 A1* | 10/2019 | Teshome | G06F 16/951 |
| 2019/0373472 A1* | 12/2019 | Smith | H04L 9/3239 |
| 2019/0394106 A1* | 12/2019 | Correnti | G06F 1/3231 |
| 2020/0028821 A1* | 1/2020 | Weisshaupt | H04L 67/025 |
| 2020/0099748 A1* | 3/2020 | Cambridge | H04L 67/125 |
| 2020/0104484 A1* | 4/2020 | Samuel | H04L 63/1425 |
| 2020/0220883 A1* | 7/2020 | Teshome | H04W 4/70 |

OTHER PUBLICATIONS

Design and Evaluation of Feature Distributed Malware Attacks against the Internet of Things(IoT). Min et al. IEEE. (Year: 2015).*

Analyzing Threats of IoT Networks using SDN Based Intrusion Detection System(SDIoT-IDS). Wani et al. Springer. (Year: 2018).*

Security Issues in the Internet of Things (IoT): A Comprehensive Study. Razaaq. IJACSA. (Year: 2017).*

Security Issues on Smarthome in IoT Environment. Yoon. Springer-Verlag. (Year: 2015).*

Fending off IoT-Hunting Attacks at Home Networks. Martin. ACM. (Year: 2017).*

A TOR-Based Anonymous Communication Approach to Secure Smart Home Appliances. Hoang. ICACT. (Year: 2014).*

KR20190067355A. Samsumg. (Year: 2019).*

A Smart Door Security-Based Home Automation System: An Internet of Things. Ajao. SF JTelecommunic. (Year: 2018).*

Increase Comfort and Security in a Smart Home Using a Prediction Algorithm and Z-Wave Protocol. Alfiah. IJET. (Year: 2018).*

Design and Fabrication of Smart Home with Internet of Things Enabled Automation System. Jabbar. IEEE. (Year: 2017).*

Design of a Secure Wireless Home Automation System with an Open Home Automation Bus (OpenHAB 2) Framework. Sowah. Hindawi. (Year: 2020).*

Artificial Intelligence-Based Semantic Internet of Things in a User-Centric Smart City. Guo. Sensors. (Year: 2018).*

ARIEL: Automatic Wi-Fi based Room Fingerprinting for Indoor Localization. Jiang. ACM. (Year: 2012).*

Low Cost Intruder Detection And Alert System Using Mobile Phone Proximity Sensor. Shahzad. IEEE. (Year: 2017).*

Deploy Spontaneously: Supporting End-Users in Building and Enhancing a Smart Home. Kawsar. ACM. (Year: 2008).*

How To Recieve Log Alerts Via Flashing Lights in Your Office or Home, Rapid7. (Year: 2013).*

Light Ears: Information Leakage via Smart Lights. Maiti. ACM. (Year: 2019).*

DPLPLN: Detection and Prevention from Flooding Attack in IoT. Gajbhiye. IEEE. (Year: 2020).*

Security Challenges in Adopting Internet of Things for Smart Network. Gupta. IEEE. (Year: 2021).*

A New Intrusion Detection System Based on KNN Classification Algorithm in Wireless Sensor Network. Li. Hindawi. (Year: 2014).*

Cisco 2800 Series Routers. (Year: 2004).*

International Search Report and Written Opinion dated Oct. 25, 2019 in International Patent Application No. PCT/2019/043625.

Extended European Search Report dated Mar. 11, 2022 in EP Patent Application No. 19844397.0, pp. 1-7.

* cited by examiner

METHODS, SYSTEMS, AND MEDIA FOR PRESENTING ALERTS INDICATING MALICIOUS ACTIVITY

TECHNICAL FIELD

The disclosed subject matter relates to methods, systems, and media for presenting alerts indicating malicious activity.

BACKGROUND

Users frequently use security programs, such as programs that detect viruses or malware, to protect user devices connected to a network. Such security programs often alert users to detected threats on a computer connected to the network, for example, with a pop-up window or an alert message displayed on a display of the computer. However, quickly noticing an alert indicating malicious activity requires a user to be using a computer on which the alert is presented, and, if the user is not using the computer when the alert is presented, the user may not be able to address the detected malicious activity until substantial damage has occurred.

Accordingly, it is desirable to provide new methods, systems, and media for presenting alerts indicating malicious activity.

SUMMARY

Methods, systems, and media for presenting alerts indicating malicious activity are provided. In accordance with some embodiments of the disclosed subject matter, a method for presenting alerts indicating malicious activity is provided, the method comprising: detecting malicious activity on a first user device connected to a router; identifying a group of user devices connected to the router; selecting a second user device of the group of user devices with which to present an alert of the malicious activity based on a likelihood that a user of the second user device is within a predetermined range of the second user device; determining a characteristic of the alert based on a capability of the second user device; and causing the alert of the malicious activity to be presented by the second user device in the determined characteristic of the alert.

In accordance with some embodiments of the disclosed subject matter, a system for presenting alerts indicating malicious activity is provided, the system comprising: a memory; and a hardware processor coupled to the memory that is configured to: detect malicious activity on a first user device connected to a router; identify a group of user devices connected to the router; select a second user device of the group of user devices with which to present an alert of the malicious activity based on a likelihood that a user of the second user device is within a predetermined range of the second user device; determine a characteristic of the alert based on a capability of the second user device; and cause the alert of the malicious activity to be presented by the second user device in the determined characteristic of the alert.

In accordance with some embodiments of the disclosed subject matter, a non-transitory computer-readable medium containing computer-executable instructions that, when executed by a processor, cause the processor to perform a method for presenting alerts indicating malicious activity is provided, the method comprising: detecting malicious activity on a first user device connected to a router; identifying a group of user devices connected to the router; selecting a second user device of the group of user devices with which to present an alert of the malicious activity based on a likelihood that a user of the second user device is within a predetermined range of the second user device; determining a characteristic of the alert based on a capability of the second user device; and causing the alert of the malicious activity to be presented by the second user device in the determined characteristic of the alert.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for presenting alerts indicating malicious activity are provided.

In some embodiments, the mechanisms described herein can detect malicious activity on a computer network, such as propagation of a virus or a worm, a hack, and/or any other suitable type of malicious activity or threat, and can cause an alert of the detected activity to be presented. In some embodiments, the mechanisms can cause an alert to be presented using a user device other than a device that detected the malicious activity. For example, in some embodiments, the mechanisms can cause an alert to be presented using an Internet of Things (IoT) device, such as a smart television, a smart speaker, a smart lighting device, and/or any other suitable type of IoT device. As a more particular example, in some embodiments, the mechanisms can cause a smart lighting device to change a current light color to a different light color (e.g., red, and/or any other suitable color) to indicate detected malicious activity. As another more particular example, in some embodiments, the mechanisms can cause a television device or a speaker device to present an audible message indicating detected malicious activity (e.g., a spoken message that indicates a type of detected activity, and/or any other suitable type of audible message).

In some embodiments, the mechanisms can select a particular user device to present an alert based on any suitable information. For example, in some embodiments, the mechanisms can identify a user device likely to be in proximity to a user (e.g., in the same room as the user, and/or in any other suitable type of proximity to the user). As a more particular example, in some embodiments, the mechanisms can determine an area of a house of a user the user is likely to be in (e.g., a living room of the house, a bedroom of the house, and/or any other suitable area) based on information such as detected motion and/or whether devices in the room are currently active, and can use a user device in the identified area to present an alert of detected malicious activity. By presenting an alert of detected malicious activity on a user device other than a device the activity was detected on, the mechanisms can allow a user of the user device to be alerted quickly to a detected threat, even if the user is not near the device that detected the activity.

Figure 5:
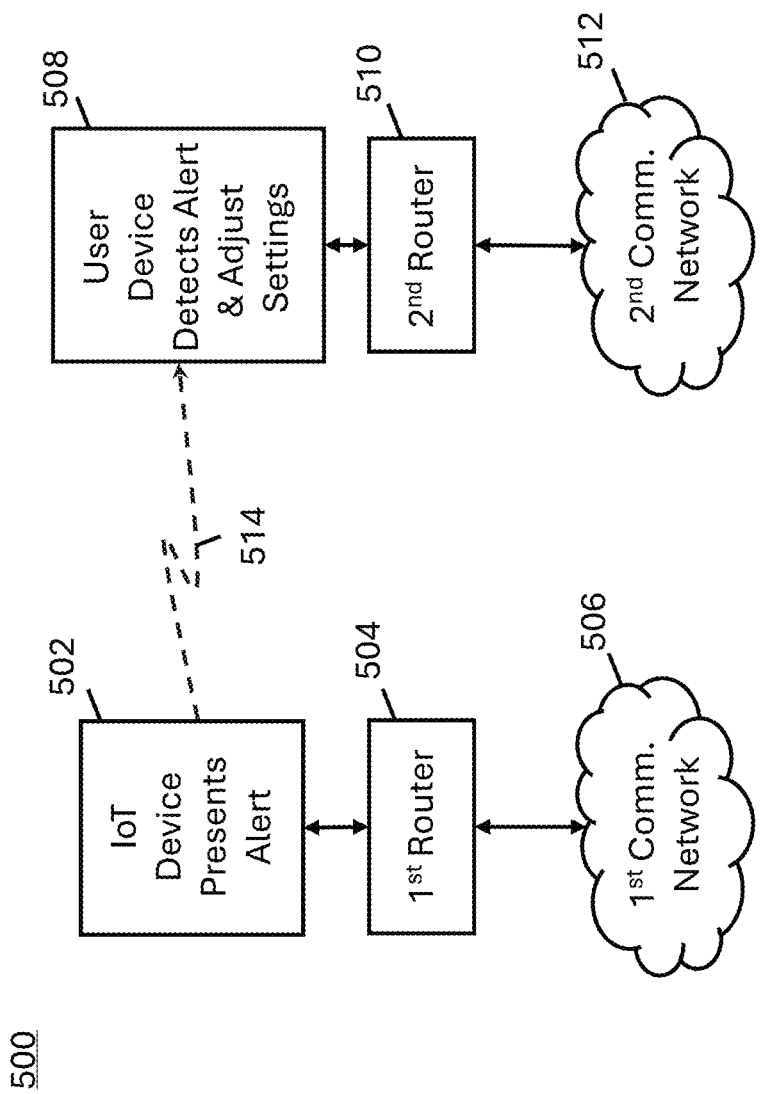
FIG. 5 shows an example of an IoT device presenting an alert that is detected by a user device on a separate network in accordance with some embodiments of the disclosed subject matter.

In some embodiments, the mechanisms described herein can cause an alert to be presented using a particular user device (e.g., a light and/or a speaker located outside a house, and/or any other suitable user device) that can be detected by a user device connected to a different router and/or a different computer network than a router and/or a computer network the malicious activity was detected on. For example, in some embodiments, the alert can be detected by a user device (e.g., a camera device, a microphone, and/or any other suitable user device) of a neighboring home, thereby alerting an owner or occupant of the neighboring home to the detected malicious activity. As a more particular example, as shown in FIG. 5, in some embodiments, the user device (IoT device) 502 associated with the router 504 and/or the computer network 506 on which the malicious activity was detected can produce a particular lighting alert (e.g., a light that flashes with a particular frequency, and/or any other suitable type of lighting alert) and/or a particular audio alert (e.g., a tone of a particular frequency or frequency sweep, a series of tones with a particular temporal or frequency pattern, an inaudible tone or tones, and/or any other suitable audio alert) 514, that can be detected by a user device 508 associated with a neighboring home. In some such embodiments, in response to detecting the alert, the user device associated with the neighboring home can perform any suitable actions, such as causing a notification to be presented on a second user device associated with a network administrator or owner of the neighboring home, automatically adjusting router 510 or network 512 settings to block incoming traffic, activating any suitable devices (e.g., outdoor lights, a smart lock, and/or any other suitable devices), automatically installing any suitable security updates, and/or performing any other suitable actions.

Note that, in some embodiments, the mechanisms described herein can additionally perform any other suitable action(s) in response to detecting malicious activity. For example, in some embodiments, the mechanisms described herein can deactivate a power switch associated with a router corresponding to a network on which the malicious activity was detected. As another example, in some embodiments, the mechanisms described herein can disable or disconnect any cameras connected to a router corresponding to a network on which the malicious activity was detected, thereby preventing the cameras from being hacked. As yet another example, in some embodiments, the mechanisms described herein can lock a smart lock in a home of the user (e.g., a lock of a front door, a lock of a garage door, and/or any other suitable type of lock) and/or disable remote unlocking of the smart lock.

In some embodiments, the mechanisms described herein can improve computer security of a computer network and/or devices connected to the computer network. For example, by presenting alerts of detected malicious activity on devices determined to be near a user (e.g., an administrator of a computer network, an owner of a home associated with the computer network, and/or any other suitable user) and/or in use by the user, the mechanisms described herein can allow the user to respond immediately to detected malicious activity, even if the user is not currently using a device that detected the malicious activity. By immediately alerting a user and/or performing any other suitable actions (e.g., disconnecting or turning off a router, blocking a network connection of any affected devices, causing any suitable security protocols to be updated, requesting that a user associated with the computer network update any suitable passwords, and/or any other suitable actions), the mechanisms described herein can quickly stop or quarantine an attack.

Figure 1:
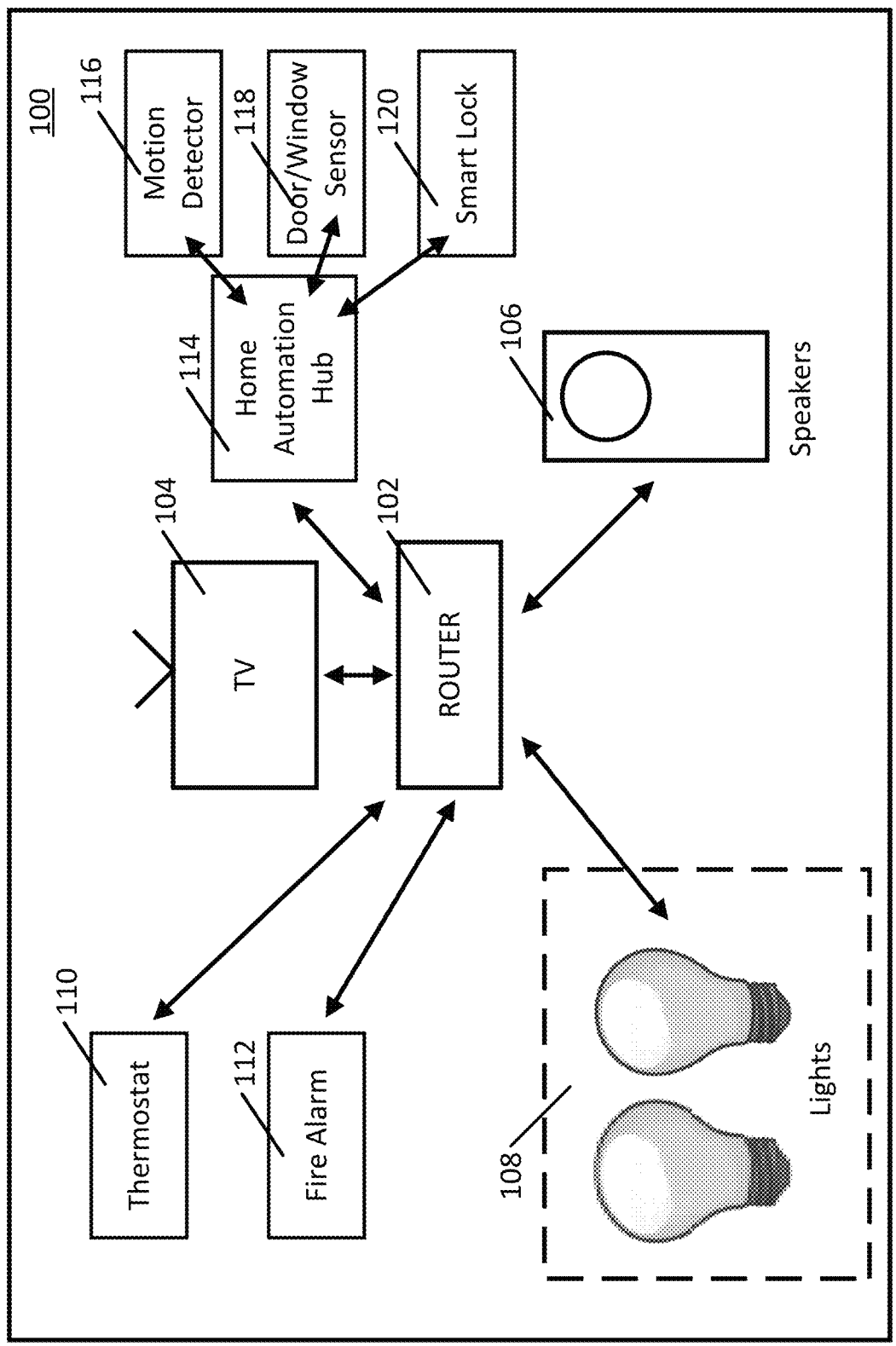
FIG. 1 shows an example of a schematic of user devices in an environment in accordance with some embodiments of the disclosed subject matter.

Turning to FIG. 1, an example 100 of a schematic of user devices in an environment is shown in accordance with some embodiments of the disclosed subject matter. As illustrated, schematic 100 can include a router 102, a home automation hub 114, and one or more user devices, such as a television 104, a smart speaker 106, and/or a smart light 108, a smart thermostat 110, a fire alarm 112, a motion detector 116, a door/window sensor 118, and/or a smart lock 120.

In some embodiments, router 102 can be any suitable router associated with any suitable network, such as a WiFi network (e.g., in a home of a user, in an office suite, and/or in any other suitable location), and/or any other suitable type of network. In some embodiments, router 102 can be associated with any suitable network security service, such as a security service that detects malicious activity on a network associated with router 102, such as a computer virus and/or any other suitable type of malware, a hack, an intrusion, an intrusion attempt, and/or any other suitable type of malicious activity. In some embodiments, router 102 can execute any suitable software that detects malicious activity on a network associated with router 102 and causes router 102 to execute any suitable action(s) in response to detecting malicious activity. For example, in some embodiments, the action(s) can include causing any of user devices 104-112 and/or 116-120 to present an alert indicating the detected malicious activity and/or perform any other suitable action (s) as shown in and described below in connection with FIG. 2.

In some embodiments, user devices 104-112 can include any suitable user devices connected to a network associated with router 102. For example, as illustrated in FIG. 1, user devices 104-112 can include any suitable IoT devices, such as a smart television 104, a smart speaker 106, a smart light 108, a smart thermostat 110, and/or a smart fire alarm 112 which can each connect to router 102 to transmit and receive data via the network associated with router 102. In some embodiments, the user devices connected to router 102 can include any other suitable user devices, such as a mobile phone, a tablet computer, a wearable computer, a laptop computer, a desktop computer, smart appliances (e.g., a washer/dryer, and/or any other suitable smart appliances), a smart lock, a smart thermostat, and/or any other suitable types of user devices. In some embodiments, user devices 116-120 can be connected to home automation hub 114 which can be connected to router 102.

Note that, in some embodiments, user devices 104-112 and 116-120 can be located in any suitable physical locations (e.g., the same or different rooms of a home of a user, in a yard of a home of a user, the same or different rooms of an office suite, and/or any other suitable physical locations). Additionally, in some embodiments, each of user devices 104-112 and/or 116-120 can be connected to router 102 and/or home automation hub 114 using any suitable type of network connection (e.g., a WiFi connection, a wired connection, a non-WiFi wireless connection such as a BLUETOOTH connection, a Zigbee connection, and/or any other suitable type of network connection).

In some embodiments, any of user devices 104-112 and/or 116-120 can be used to present an alert indicating that malicious activity has been detected on a network associated with router 102 and/or perform any other suitable action(s) in response to detection of malicious activity. For example, in some embodiments, a visual message and/or an audio message can be presented on television 102. As another example, in some embodiments, an audio message can be presented using speaker 106. As yet another example, in some embodiments, a color of light 108 and/or a pattern of flashing of light 108 can be changed to indicate detection of the malicious activity. More detailed techniques for using user devices 104-112 and/or 116-120 to present alerts of malicious activity are described below in connection with FIG. 2.

Figure 2:
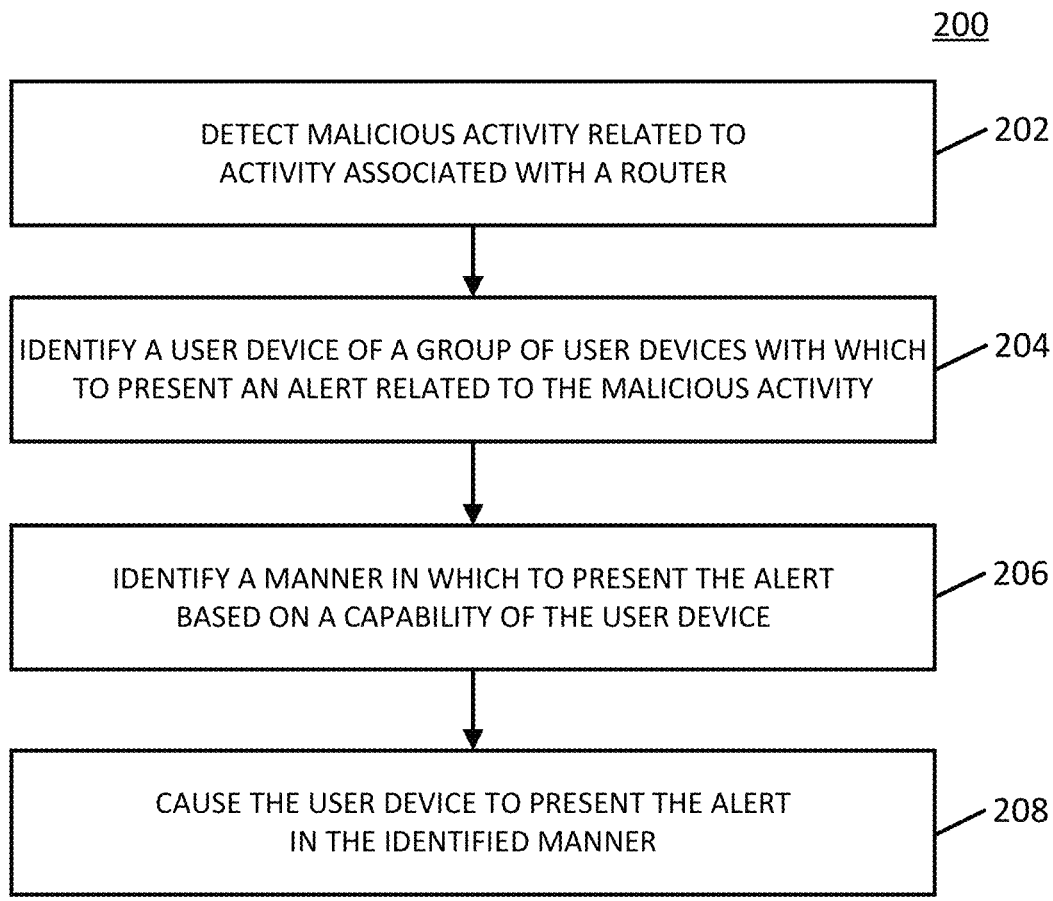
FIG. 2 shows an example of a process for presenting alerts indicating malicious activity in accordance with some embodiments of the disclosed subject matter.

Turning to FIG. 2, an example 200 of a process for presenting alerts indicating malicious activity is shown in accordance with some embodiments of the disclosed subject matter. In some embodiments, blocks of process 200 can be executed by a router, such as router 102 as shown in and described above in connection with FIG. 1.

Process 200 can begin at 202 by detecting malicious activity (which can include suspected malicious activity) related to activity associated with a router. In some embodiments, the malicious activity can include any suitable activity, such as detection of content (e.g., data, a file, a program, a document, a picture, a video, audio, etc.) likely to contain a virus, worm, or other malware, detection of a hack of a user device connected to the router, detection of an intrusion or an intrusion attempt, detection of participation of a user device connected to the router in a Denial of Service (DoS) attack, detection of a suspicious connection between a user device and a remote device, and/or any other suitable type of malicious activity.

In some embodiments, process 200 can detect the malicious activity in any suitable manner and using any suitable technique(s). For example, in some embodiments, process 200 can detect malicious activity by detecting a known signature associated with malicious activity. In some such embodiments, process 200 can receive indications of known signatures associated with malicious activity from any suitable device, such as a server associated with a security service (e.g., server(s) 302, as shown in and described below in connection with FIG. 3). In some embodiments, both the router and the server can be associated with the security service. As another example, in some embodiments, process 200 can detect malicious activity associated with a user device connected to the router based on anomalous activity by the user device. As a more particular example, in some embodiments, process 200 can detect anomalous requests to connect to a particular site or other destination. As another more particular example, in some embodiments, process 200 can detect a hack of a thermostat by determining that the thermostat has been set to an anomalously high or low temperature.

At 204, process 200 can identify a user device of a group of user devices with which to present an alert related to the malicious activity. In some embodiments, the group of user devices can include any suitable user devices. For example, in some embodiments, the group of user devices can include any user devices connected to the router associated with process 200 (e.g., user devices as shown in and described above in connection with FIG. 1). In some embodiments, the group of user devices can include any suitable type(s) of user devices (e.g., mobile phones, tablet computers, laptop computers, desktop computers, smart appliances, smart media players, smart thermostats, smart security systems, and/or any other suitable types of user devices) and any suitable number (e.g., one, two, ten, twenty, and/or any other suitable number) of user devices. In some embodiments, process 200 can identify the group of user device in any suitable manner. For example, in some embodiments, process 200 can identify all user devices currently connected to the router.

Process 200 can identify the user device of the group of user devices with which to present an alert related to the malicious activity based on any suitable information and using any suitable technique(s). For example, in some embodiments, process 200 can identify the user device of the group of user devices based on a likelihood that a user of the user device is in proximity to the user device and/or within a predetermined range of the user device (e.g., within ten feet, within fifteen feet, and/or within any other suitable predetermined range). As a more particular example, in some embodiments, process 200 can identify a user device of the group of user devices likely to be in a room with the user based on any suitable information. As a specific example, in an instance where process 200 determines that all lights in a house of the user are off other than lights in a bedroom, process 200 can determine the user is likely to be in the bedroom, and can identify bedroom lights as the user device in the group of user devices. As another specific example, in an instance where process 200 determines that a living room television is currently in use, process 200 can determine the user is likely to be in the living room, and can identify any suitable user devices in the living room as the user device (e.g., the living room television, living room speakers, living room lights, and/or any other suitable user device). As yet another specific example, in some embodiments, process 200 can determine that a user of the user devices is likely to be in a particular room of a house based on a determination that two or more devices known to be located in the same room of the house are both currently active (e.g., that living room lights are on and a living room television is currently on, and/or any other suitable two or more user devices). Note that, in some embodiments, process 200 can determine current or recent activity of user devices in the group of user devices using any suitable technique(s). For example, in some embodiments, process 200 can identify user devices in the group of user devices that have participated in network activity via the router within a predetermined time range (e.g., within the past five minutes, within the past hour, and/or any other suitable time range). As still another specific example, in some embodiments, process 200 can identify a user device of the group of user devices based on detection of motion by the user device (e.g., by a smart thermostat, and/or by any other suitable type of user device). As still another specific example, in some embodiments, process 200 can identify a user device of the group of user devices by detecting a proximity of the user device to another user device of the user (e.g., to a mobile phone, to a tablet computer, to a laptop computer, and/or to any other suitable user device) based on detection of a BLUETOOTH connection between the two user devices.

Note that, in some embodiments, in instances where process 200 identifies two or more user devices that are likely to be within proximity to a user of the two or more user devices, process 200 can select one user device of the two or more user devices with which to present the alert based on any suitable information or criteria. For example, in some embodiments, process 200 can select a user device based on a capability to present a visual message (e.g., by selecting a television device from two user devices that include lights and the television device). As another example, in some embodiments, process 200 can select a user device based on a capability to present an audio message (e.g., by selecting a speaker device from two user devices that include lights and the speaker device). As yet another example, in some embodiments, process 200 can select a user device based on a capability to present a relatively unobtrusive alert (e.g., a lighting change, and/or any other suitable type of alert). As a more particular example, in some embodiments, process 200 can select a user device based on a capability to present a relatively unobtrusive alert based on a determination that the detected activity has not been confirmed as a severe threat yet, and/or based on any other suitable determination of relative urgency or severity. As still another example, in some embodiments, process 200 can select a user device based on a capability to present a relatively obtrusive alert (e.g., a loud noise, relatively bright lights, and/or any other suitable type of obtrusive alert) based on a determination that the detected activity has been confirmed as a relatively severe threat, and/or based on any other suitable determination of relative urgency or severity. Alternatively, in some embodiments, process 200 can determine that an alert is to be presented using multiple modes (e.g., video, audio, lights, etc.) and/or multiple of the identified user devices likely to be within a predetermined proximity to a user.

As another example, in some embodiments, process 200 can identify the user device of the group of user devices with which to present the alert indicating the detected malicious activity based on an explicit indication by a user of the user device. As a more particular example, in some embodiments, the user of the user device can specify a particular user device or particular user devices to be used to present the alert via an application corresponding to a security service associated with the router. In some such embodiments, the application can be an application executing on a mobile phone of the user, a tablet computer of the user, a laptop computer of the user, and/or any other suitable user device. Note that, in some embodiments, the application can be used to configure any other suitable settings associated with the security service, such as sites that are to be blocked by the router, parental controls (e.g., that indicate times that particular sites are to be blocked by the router, sites associated with particular types of content that are to be blocked by the router, and/or any other suitable types of controls) and/or any other suitable settings.

Note that, in some embodiments, process 200 can identify any other suitable devices with which an action related to the malicious activity is to be performed. For example, in some embodiments, process 200 can identify a smart lock (e.g., a lock corresponding to a front door or a back door of a house, a lock corresponding to a garage door of a house, and/or any other suitable smart lock) that is to be locked in response to detection of the malicious activity. As another example, in some embodiments, process 200 can disable remote unlocking of a smart lock. As yet another example, in some embodiments, process 200 can identify a power switch associated with the router which is to be deactivated to turn off the router in response to detection of the malicious activity, thereby stopping network activity through the router.

At 206, process 200 can identify a manner in which to present the alert based on a capability of the identified user device. For example, in instances where the identified user device corresponds to a lighting device, such as one or more smart lights, process 200 can determine that the manner in which to present the alert is to be a change in a lighting characteristic of the lighting device. As a more particular example, in some embodiments, process 200 can determine that the lighting device is to change to present light of a particular color that indicates the malicious activity and/or a threat level of the malicious activity. As a specific example, in some embodiments, process 200 can determine that the lighting device is to present red light (or any other suitable color) to indicate detection of the malicious activity and/or to indicate a relative severity (e.g., that the malicious activity has been confirmed with high confidence, that the threat should be addressed immediately, and/or any other suitable indication of severity) of the detected malicious activity. Note that, in some embodiments, a color of the light of the lighting device can be used to indicate severity, for example, with red light indicating high severity, yellow light indicating medium severity, etc. As another specific example, in some embodiments, process 200 can determine that the lighting device is to present a flashing light in any suitable pattern to indicate detection of the malicious activity. Note that, in some embodiments, a frequency at which light of the lighting device flashes can be used to indicate severity of the detected activity, for example, with a relatively high frequency of flashing (e.g., once per second, twice per second, and/or any other suitable frequency) indicating high severity and a relatively low frequency of flashing (e.g., once per minute, once per two minutes, and/or any other suitable frequency) indicating a lower severity, etc.

As another example, in instances where the identified user device corresponds to a media playback device (e.g., a television, speakers, and/or any other suitable type of media playback device), process 200 can determine whether the alert is to be a visual alert and/or an audible alert based on a capability of the media playback device. As a more particular example, in response to determining that the media playback device is a device with an associated display (e.g., a television, and/or any other suitable media playback device), process 200 can determine that the alert is to include a visual message (e.g., a pop-up window, a pop-up user interface, and/or any other suitable type of visual alert). As another more particular example, in response to determining that the media playback device is a device that is not associated with a display (e.g., speakers, a virtual assistant device, and/or any other suitable type of media playback device), process 200 can determine that the alert is to include an audible message (e.g., a spoken message, a particular tone or sound, and/or any other suitable type of audible message). As yet another more particular example, in response to determining that the media playback device is a device associated with a speaker (e.g., a speaker, a television, a virtual assistant device, and/or any other suitable media playback device), process 200 can determine that the alert is to include an audible alert (e.g., a spoken message, a sound or a tone, and/or any other suitable type of audible alert). Note that, in instances where the media playback device is associated with a display, process 200 can determine that the media playback device is to present a visual message and an audible message.

Additionally, note that, in some embodiments, process 200 can determine that the one or more of the identified user devices is to present a lighting change, sound, or tone that is invisible and/or inaudible to humans. For example, in some embodiments, process 200 can determine that an identified light device is to begin flickering at a frequency that is not detectable to humans. As another example, in some embodiments, process 200 can determine that an identified media playback device is to begin emitting a sound or tone at a frequency that is not audible to humans. In some such embodiments, a lighting change, sound, or tone that is not detectable by humans can be presented by the identified user device to alert other nearby devices not connected to the router of the malicious activity. For example, in some embodiments, process 200 can cause lighting devices and/or speaker devices outside a user's home to begin producing a particular light pattern, sound, and/or tone, which can then be detected by any suitable receiver or detection device (e.g., a microphone, a camera, and/or any other suitable device) located in or outside a neighboring home, thereby alerting an occupant of the neighboring home to the malicious activity. As yet another example, in some embodiments, process 200 can determine that a signal is to be transmitted (e.g., a broadcast signal, a wireless signal, via the Internet, and/or in any other suitable manner) that includes an indication of the detected activity. In some such embodiments, the signal can then be detected by any receiver device within a proximity to receive the signal. Note that, in some such embodiments, devices associated with the neighboring home and/or any other suitable devices that receive a signal indicating detected malicious activity (e.g., devices connected to a different router or a different computer network than the router or network associated with process 200) can then perform any suitable actions to respond to the detected light pattern, sound, and/or tone, such as blocking particular network ports, inhibiting or blocking particular types of network activity, performing any suitable security scans of devices connected to a network of the neighboring home, and/or preforming any other suitable action(s). Additionally, in some embodiments, a device that detects a signal indicating detected malicious activity can cause a notification to be presented on one or more user devices (e.g., user devices associated with occupants of neighboring homes, and/or any other suitable user devices) as a push notification, a text message, and/or in any other suitable manner.

At 208, process 200 can cause the user device to present the alert in the identified manner. For example, in instances where process 200 determines that the user device is a lighting device that is to implement a change in lighting or present light with a particular visual characteristic, process 200 can cause the lighting device to produce a particular color light (e.g., red, yellow, green, and/or any other suitable color), a particular pattern of light (e.g., flashing at a particular frequency, a pattern of changing light colors, and/or any other suitable pattern), and/or any other suitable type of lighting. As another example, in instances where process 200 determines that the user device is to present a visual message (e.g., on a television display, and/or on any other suitable display), process 200 can cause the user device to present any suitable visual message (e.g., a message indicating a type of malicious activity that was detected, a message indicating a time the malicious activity was detected, and/or any other suitable type of visual message). As a more particular example, in some embodiments, a visual message can be "a virus was detected on your desktop computer," "an attempted hack was detected on your laptop computer," and/or any other suitable type of message. Note that, in some embodiments, process 200 can cause the visual message to be a pop-up message or other user interface that is overlaid on visual content currently being presented by the user device. For example, in some embodiments, process 200 can cause a pop-up message to be overlaid on a movie being presented on a television. As yet another example, in instances where process 200 determines that the user device is to present an audible message (e.g., using speakers, a television, and/or any other suitable type of device), process 200 can cause the user device to produce a particular sound, tone, or spoken message. As a more particular example, in some embodiments, process 200 can cause the user device to present a spoken message that indicates the detected malicious activity, such as "a virus was detected on your desktop computer," and/or any other suitable type of spoken message. In some such embodiments, a spoken message can be a pre-recorded audio file that is played by the identified user device. As another more particular example, in some embodiments, process 200 can cause the user device to present a particular sound or tone that is to indicate detected malicious activity, such as a beeping sound, a horn sound, a chime, a frequency sweep, and/or any other suitable sound or tone. Note that, as described above, process 200 can cause a lighting device, speakers, or other user device to produce a light, light pattern, or sound that is not detectable by humans.

Additionally, note that, in some embodiments, process 200 can cause any suitable message to be presented on a mobile phone, tablet computer, laptop computer, desktop computer, etc. of a user associated with the router. For example, in some embodiments, process 200 can cause a message to be presented on a user device that is executing an application corresponding to a security service associated with the router. In some embodiments, the message can indicate any suitable information related to the detected malicious activity. For example, in some embodiments, in instances where the alert does not explicitly indicate a type of malicious activity or other information (e.g., in instances where the alert is a light or light pattern of a lighting device, a sound or tone, and/or any other suitable type of alert), the message can indicate the type of detected malicious activity (e.g., a detected virus, a detected hack, and/or any other suitable type of activity). As another example, in some embodiments, process 200 can present additional information not indicated in the alert, such as a time the activity was detected, actions that are being taken in response to detecting the attack (e.g., that the router will be turned off, that the router will begin blocking some or all network activity, that a smart lock is locking a particular door, and/or any other suitable type of action), a name of a detected virus, and/or any other suitable information. In some embodiments, the message can be presented in any suitable manner, such as an e-mail, a text message, a push notification, and/or any other suitable type of message. Note that, in some embodiments, the user device with which the additional information is presented does not have to be physically located in the same environment as the user device with which the alert was presented.

In some embodiments, process 200 can perform any other suitable action(s) in response to detecting the malicious activity. For example, in some embodiments, process 200 can activate a power switch associated with the router that causes the router to be turned off. As another example, in some embodiments, process 200 can activate a relay or any other suitable device associated with the router that causes a wired connection (e.g., an ethernet connection, and/or any other suitable type of wired connection) associated with the router to be disconnected. As yet another example, in some embodiments, process 200 can cause particular network ports to be blocked (e.g., ports associated with file transfers, ports associated with fetching email messages, and/or any other suitable ports). As still another example, in some embodiments, process 200 can cause any suitable camera devices connected to the router to be disabled, thereby preventing a detected hacker from accessing the camera devices. As still another example, in some embodiments, process 200 can install any suitable security updates and/or present any suitable user interfaces requesting a user perform actions related to updating security (e.g., update firmware, patches, and/or any installed software, set any missing permissions, cause a device to identify and install updates in response to being rebooted, request that a user associated with the router updated any suitable passwords, and/or perform any other suitable actions). As still another example, in some embodiments, process 200 can reboot the router. As still another example, in some embodiments, process 200 can perform any suitable actions with respect to non-compliant devices connected to the router, such as blocking a network connection of the devices and/or capturing network information routed to particular devices for further analysis. Note that, in some embodiments, any action(s) taken by process 200 can be disabled by a user, for example, via an application corresponding to a security service associated with the router. For example, in an instance where a wired connection of the router is disconnected, the wired connection can be re-connected based on input received via the application.

Figure 3:
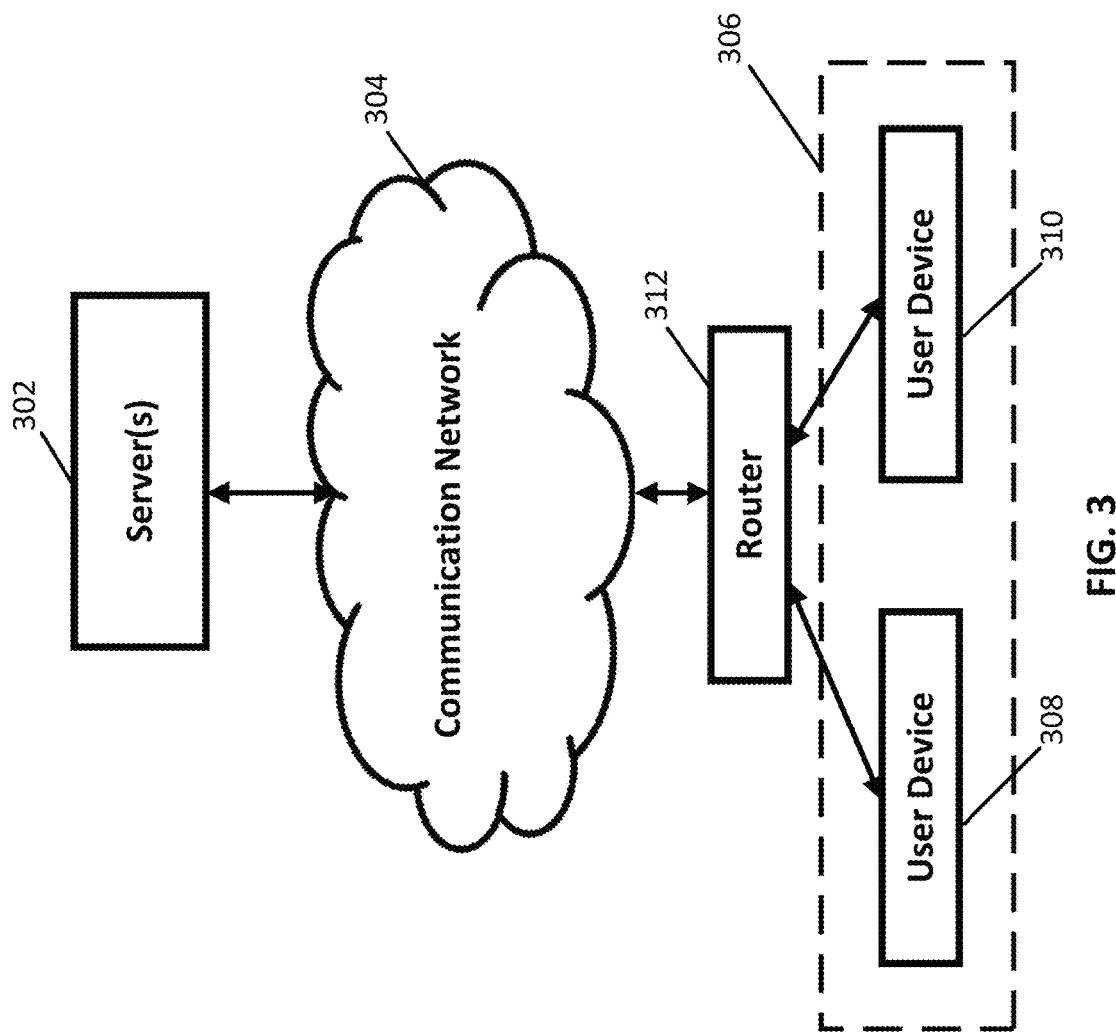
FIG. 3 shows a schematic diagram of an illustrative system suitable for implementation of mechanisms described herein for presenting alerts indicating malicious activity in accordance with some embodiments of the disclosed subject matter.

Turning to FIG. 3, an example 300 of hardware for presenting alerts indicating malicious activity that can be used in accordance with some embodiments of the disclosed subject matter is shown. As illustrated, hardware 300 can include one or more servers 302, a communication network 304, one or more user devices 306, such as user devices 308 and 310, and/or a router 312. Note that, in some embodiments, server(s) 302 and/or router 312 can each be associated with a security service that performs any suitable functions, such as storing user-specified restrictions indicating sites that are to be blocked by devices using router 312, detecting malicious activity on any devices protected by the security service, and/or any other suitable functions.

Server(s) 302 can be any suitable server(s) for storing information, data, programs, and/or any other suitable type of content for detecting malicious activity from user devices. For example, in some embodiments, server(s) 302 can determine whether a request by a user device to access a particular destination site is to be blocked, based on, for example, user-specified restrictions, and/or any other suitable information. As another example, in some embodiments, server(s) 302 can collect any suitable data or information from any suitable devices (e.g., different routers associated with different networks, and/or any other suitable devices) to generate signatures related to malicious activity, which can then be used to detect malicious activity associated with router 312.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, user devices 306 can be connected by one or more communications links to communication network 304 via router 312. In some embodiments, communication network 304 can be linked via one or more communications links to server(s) 302. The communications links can be any communications links suitable for communicating data among user devices 306 and server(s) 302, such as network links, dial-up links, wireless links, hard-wired links, any other suitable communications links, or any suitable combination of such links.

User devices 306 can include any one or more user devices. For example, in some embodiments, user devices 306 can include user devices, such as a mobile phone, a tablet computer, a wearable computer, a laptop computer, a desktop computer, and/or any other suitable user devices. As another example, in some embodiments, user devices 306 can include any suitable IoT devices such as smart appliances (e.g., smart thermostats, smart kitchen appliances, and/or any other suitable type of smart appliances), smart media devices (e.g., speakers, televisions, and/or any other suitable type of media playback devices), and/or any other suitable type of IoT devices.

Although server(s) 302 is illustrated as one device, the functions performed by server(s) 302 can be performed using any suitable number of devices in some embodiments. For example, in some embodiments, multiple devices can be used to implement the functions performed by server(s) 302.

Although two user devices 306 are shown in FIG. 3 to avoid over-complicating the figure, any suitable number of user devices, and/or any suitable types of user devices, can be used in some embodiments.

Figure 4:
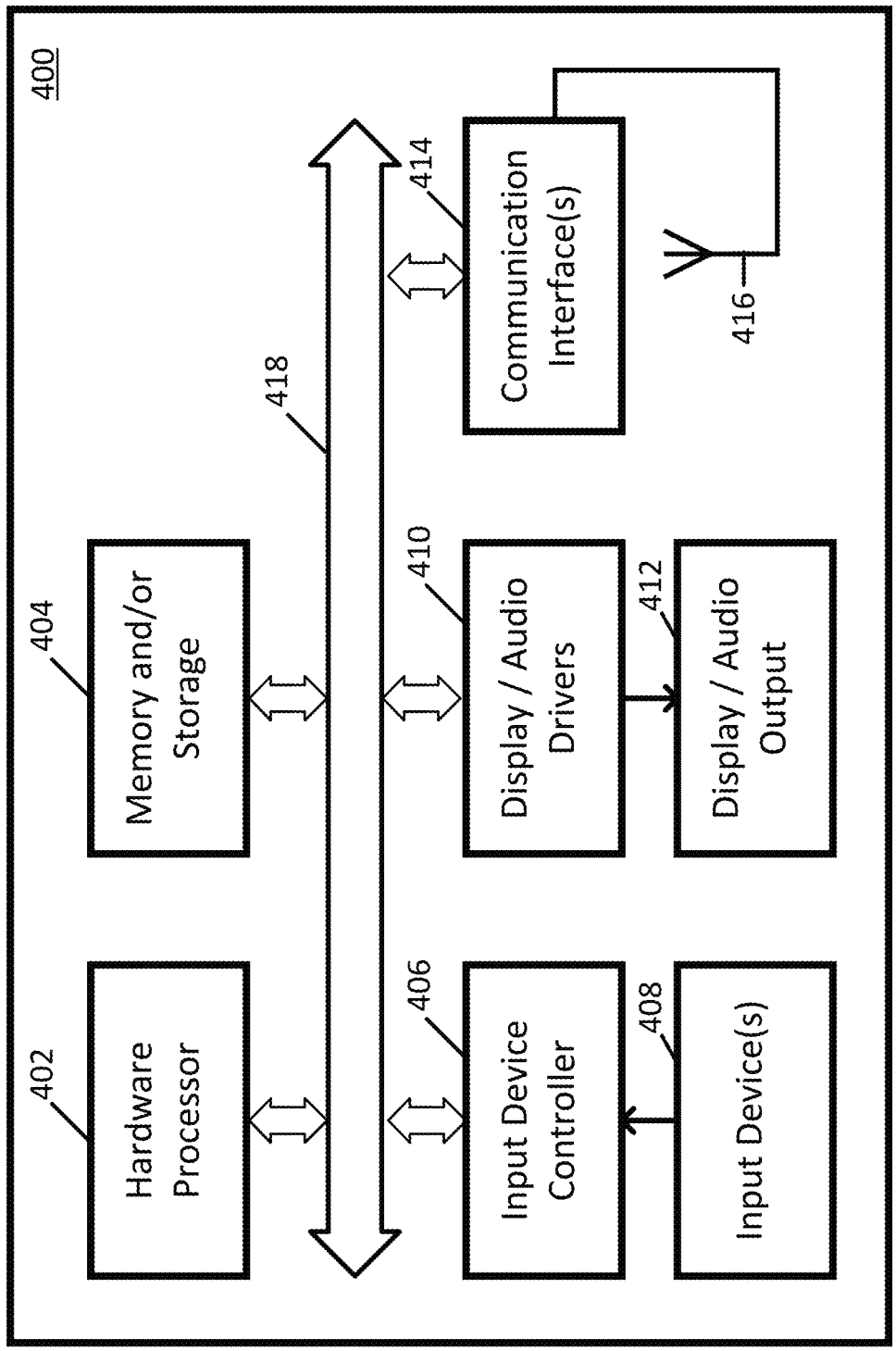
FIG. 4 shows a detailed example of hardware that can be used in a server and/or a user device of FIG. 3 in accordance with some embodiments of the disclosed subject matter.

Server(s) 302 and user devices 306 can be implemented using any suitable hardware in some embodiments. For example, in some embodiments, devices 302 and 306 can be implemented using any suitable general-purpose computer or special-purpose computer. For example, an IoT device, such as a smart appliance, may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a computer program stored in memory and/or storage of a router, such as router 312. For example, in some embodiments, the computer program can cause hardware processor 402 to detect malicious activity on a network associated with router 312, identify a user device connected to router 312 with which to present an alert, cause the user device to present the alert, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the process of FIG. 2 can be executed or performed in any order or sequence not limited to the order and sequence shown in and described in connection with the figure. Also, some of the above blocks of FIG. 2 can be executed or performed substantially simultaneously where appropriate or in parallel to reduce latency and processing times. Additionally or alternatively, some of the above described blocks of the process of FIG. 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting alerts indicating malicious activity are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting alerts of malicious activity, comprising:
    detecting malicious activity on a first communication network using a hardware processor coupled to the first communication network;
    identifying a group of user devices connected to the first communication network;
    selecting an Internet of Things (IoT) device in the group of user devices with which to present an alert of the malicious activity on the first communication network to a person based on a likelihood that the person is within a predetermined physical distance of the IoT device and based on an alert generation capability of the IoT device;
    determining a characteristic of the alert based on a capability of the IoT device;
    causing the alert of the malicious activity on the first communication network to be presented by the IoT device in the determined characteristic of the alert, wherein the presentation of the alert includes at least one of playing a sound and generating light;
    detecting at least one of the playing of the sound and the generating of the light of the alert presented by the IoT device using a user device connected to a second communication network different from the first communication network; and
    automatically adjusting router or network settings to block incoming traffic on the second communication network in response to the detecting of the sound and/or the light of the alert presented by the IoT device using a user device.

2. The method of claim 1, wherein the IoT device is a lighting device, and wherein the characteristic of the alert is a color of lighting.

3. The method of claim 1, wherein the IoT device is a speaker, and wherein the characteristic of the alert is an audible alert presented by the speaker.

4. The method of claim 3, wherein the audible alert is a spoken message indicating the malicious activity.

5. The method of claim 1, wherein the characteristic of the alert is that the alert is a sound that is inaudible to humans.

6. The method of claim 1, further comprising causing power of a router on the first communication network to be turned off.

7. The method of claim 1, further comprising determining the likelihood that the person is within the predetermined physical distance of the IoT device based on activity of the IoT device.

8. A system for presenting alerts of malicious activity, the system comprising:
    a memory; and
    a first hardware processor, coupled to the memory and to a first communication network, that is configured to:
        detect malicious activity on the first communication network;
        identify a group of user devices connected to the first communication network;
        select an Internet of Things (IoT) device in the group of user devices with which to present an alert of the malicious activity on the first communication network to a person based on a likelihood that the person is within a predetermined physical distance of the IoT device and based on an alert generation capability of the IoT device;
        determine a characteristic of the alert based on a capability of the IoT device; and cause the alert of the malicious activity on the first communication network to be presented by the IoT device in the determined characteristic of the alert, wherein the presentation of the alert includes at least one of playing a sound and generating light; and a second hardware processor that is configured to:

detect at least one of the playing of the sound and the generating of the light of the alert presented by the IoT device using a user device connected to a second communication network different from the first communication network; and automatically adjust router or network settings to block incoming traffic on the second communication network in response to the detecting of the sound and/or the light of the alert presented by the IoT device using a user device.

9. The system of claim 8, wherein the IoT device is a lighting device, and wherein the characteristic of the alert is a color of lighting.

10. The system of claim 8, wherein the IoT device is a speaker, and wherein the characteristic of the alert is an audible alert presented by the speaker.

11. The system of claim 10, wherein the audible alert is a spoken message indicating the malicious activity.

12. The system of claim 8, wherein the characteristic of the alert is that the alert is a sound that is inaudible to humans.

13. The system of claim 8, wherein the first hardware processor is further configured to cause power of a router on the first communication network to be turned off.

14. The system of claim 8, wherein the first hardware processor is further configured to determine the likelihood that the person is within the predetermined physical distance of the IoT device based on activity of the IoT device.

15. A non-transitory computer-readable medium containing computer-executable instructions that, when executed by a processor coupled to a first communication network, cause the processor to perform a method for presenting alerts of malicious activity, the method comprising:

detecting malicious activity on the first communication network;

identifying a group of user devices connected to the first communication network;

selecting an Internet of Things (IoT) device in the group of user devices with which to present an alert of the malicious activity on the first communication network to a person based on a likelihood that the person is within a predetermined physical distance of the IoT device and based on an alert generation capability of the IoT device;

determining a characteristic of the alert based on a capability of the IoT device;

causing the alert of the malicious activity on the first communication network to be presented by the IoT device, wherein the presentation of the alert includes at least one of playing a sound and generating light;

detecting at least one of the playing of the sound and the generating of the light of the alert presented by the IoT device using a user device connected to a second communication network different from the first communication network; and automatically adjusting router or network settings to block incoming traffic on the second communication network in response to the detecting of the sound and/or the light of the alert presented by the IoT device using a user device.

16. The non-transitory computer-readable medium of claim 15, wherein the IoT device is a lighting device, and wherein the characteristic of the alert is a color of lighting.

17. The non-transitory computer-readable medium of claim 15, wherein the IoT device is a speaker, and wherein the characteristic of the alert is an audible alert presented by the speaker.

18. The non-transitory computer-readable medium of claim 17, wherein the audible alert is a spoken message indicating the malicious activity.

19. The non-transitory computer-readable medium of claim 15, wherein the characteristic of the alert is that the alert is a sound that is inaudible to humans.

20. The non-transitory computer-readable medium of claim 15, wherein the method further comprises causing power of a router on the first communication network to be turned off.

21. The non-transitory computer-readable medium of claim 15, wherein the method further comprises determining the likelihood that the person is within the predetermined physical distance of the IoT device based on activity of the IoT device.

22. The method of claim 1, wherein the hardware processor is part of a router.

23. The system of claim 8, wherein the hardware processor is part of a router.

24. The non-transitory computer-readable medium of claim 15, wherein the processor is part of a router.

* * * * *